United States Patent

Adriaenssens

[11] Patent Number: 5,342,247
[45] Date of Patent: Aug. 30, 1994

[54] TRANSMISSION UNIT FOR MOTOR VEHICLES

[75] Inventor: Frank Adriaenssens, Korbeek-Dijle, Belgium

[73] Assignee: Volvo Car Sint-Truiden, naamloze vennootschap, Sint-Truiden, Belgium

[21] Appl. No.: 147

[22] Filed: Jan. 4, 1993

[30] Foreign Application Priority Data

Jan. 20, 1992 [BE] Belgium .................. 09200056

[51] Int. Cl.⁵ .................................. F16H 59/00
[52] U.S. Cl. ............................. 474/16; 474/18; 474/28
[58] Field of Search ............. 474/12, 16, 18, 28; 74/862, 867, 868

[56] References Cited

U.S. PATENT DOCUMENTS

| | | | |
|---|---|---|---|
| 4,143,558 | 3/1979 | van Deursen et al. | 474/28 |
| 4,494,942 | 1/1985 | Hirano et al. | 474/28 |
| 4,575,364 | 3/1986 | Lamers | 474/28 X |
| 4,946,423 | 8/1990 | van Beek | 474/28 X |

FOREIGN PATENT DOCUMENTS 0128611 12/1984 European Pat. Off. .
630127 5/1936 Fed. Rep. of Germany .

*Primary Examiner*—Ramon S. Britts
*Assistant Examiner*—Roger J. Schoeppel

[57] ABSTRACT

Transmission unit consisting of a continuously variable transmission (1); a hydraulic cylinder/piston unit (3) to set the transmission ratio of the continuously variable transmission (2); a pressure compensation chamber (4) working in conjunction with the cylinder/piston unit (3); and a passage organ (5) having at least one passage way (6) connecting the pressure compensation chamber (4) with the piston chamber (7) of said cylinder/piston unit (3), characterized in that the passage way (6) stretches at least partially along the outer surface of the passage organ (5).

12 Claims, 1 Drawing Sheet

TRANSMISSION UNIT FOR MOTOR VEHICLES

BACKGROUND

The present invention concerns a transmission unit for motor vehicles, and in particular to the type whereby the transmission ratio is regulated steplessly by means of a continuously variable transmission.

It is known that such transmission units, apart from the actual transmission, are provided with a hydraulic cylinder/piston unit to set the transmission ratio of the continuously variable transmission. It is also known that such transmission units can be equipped with a pressure compensation chamber to compensate increases of pressure in the piston chamber of the cylinder/piston unit resulting from centrifugal forces, whereby this pressure compensation chamber is connected with said piston chamber via a filler port.

It is also known that this filler port can be provided with a passage organ having a passage opening with very precise dimensions, for example as described in Dutch patent application No 8302089.

The known passage organs are disadvantageous in that they are composed of different parts, which considerably increases the risk of manufacturing faults as well as the total cost of production.

Another disadvantage consists in that the passage openings in these existing passage organs are mainly situated centrally and thus can only be made by drilling, punching or the like. Technically, it is very difficult to make the small passage openings in accordance with the required tolerances. This results in frequent disturbances during the working of the transmission unit.

SUMMARY OF THE INVENTION

The present invention aims to overcome the above-mentioned problems and other disadvantages of the prior art.

To this aim the invention is directed to a transmission unit consisting of a continuously variable transmission; a hydraulic cylinder/piston unit to set the transmission ratio of the continuously variable transmission; a pressure compensation chamber working in conjunction with the cylinder/piston unit; and a passage organ having at least one passage opening connecting the pressure compensation chamber with the piston chamber of said cylinder/piston unit, characterized in that the passage opening stretches at least partially along the outer surface of the passage organ.

By providing the passage opening on the outer surface of the passage organ, it is possible to obtain a relatively large accuracy by means of relatively simple operations. In this case, the passage opening can be made through grinding or by already providing this opening as the passage organ is still being molded.

The simplicity of the passage organ according to the invention makes it possible to manufacture it through molding without even one finishing process being required.

Moreover, this process makes it possible to simultaneously mold in a filter gauze without any extra manufacturing stages being required.

BRIEF DESCRIPTION OF THE DRAWINGS

In order to better explain the characteristics according to the invention, the following preferred embodiment is described by way of example only and without being limitative in any way with reference to the accompanying drawings, where.

DETAILED DESCRIPTION OF THE PREFERRED EMBODIMENT

Figure 1:
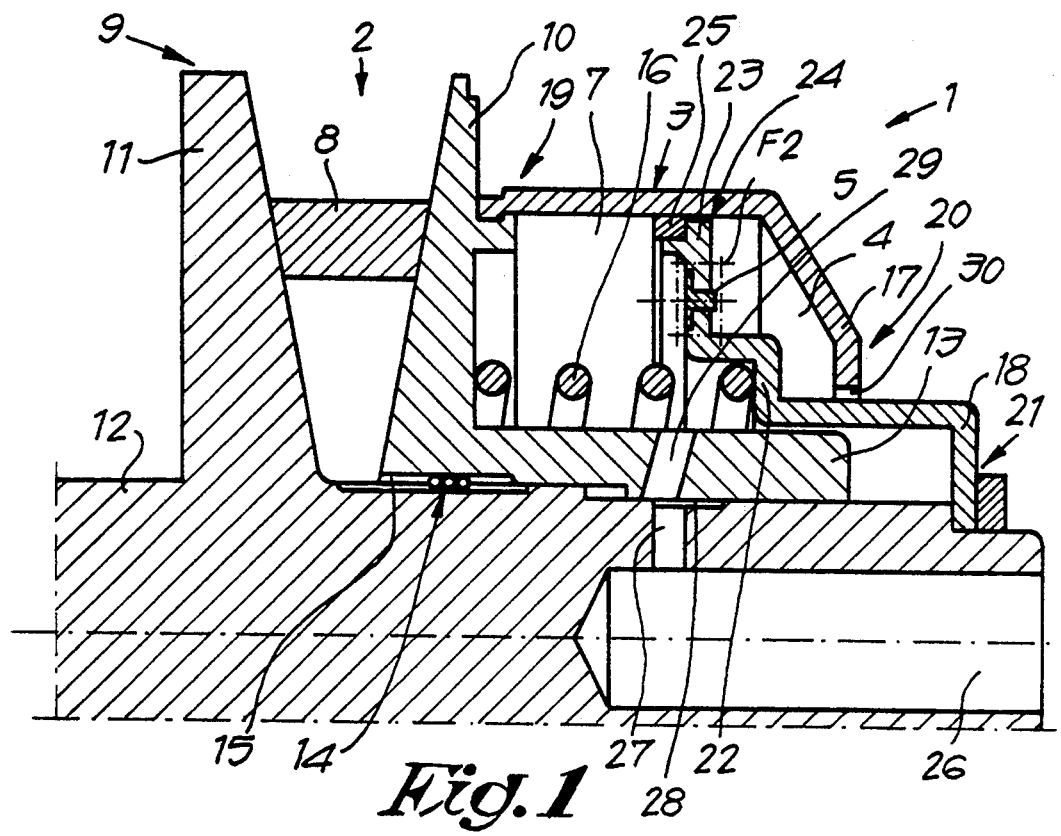
FIG. 1 shows a section of a part of a transmission unit according to the invention.
Figure 2:
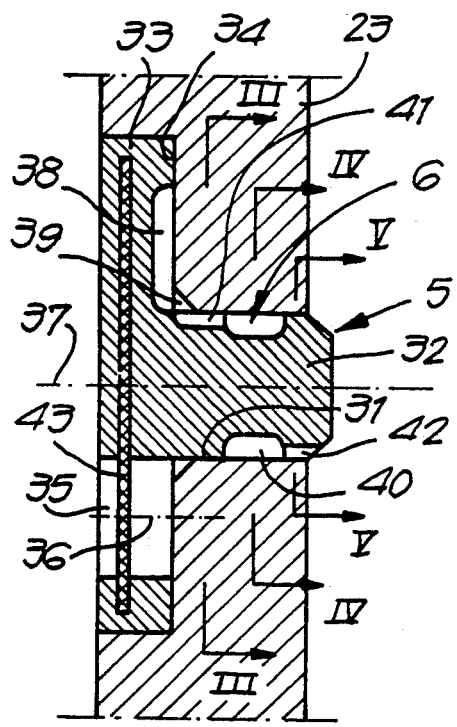
FIG. 2 shows a view on a larger scale of the part indicated in FIG. 1 by F2.
Figure 3:
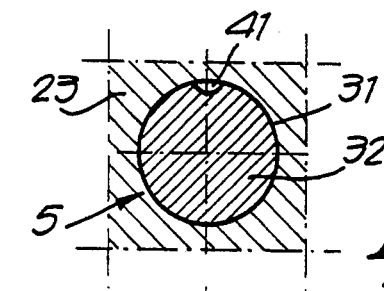
FIGS. 3, 4 and 5 are sections according to lines III—III, IV—IV and V—V in FIG. 2.
Figure 4:
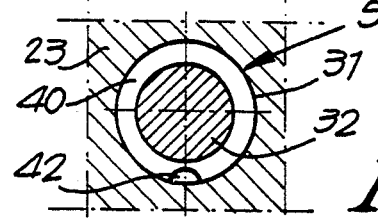
Figure 5:
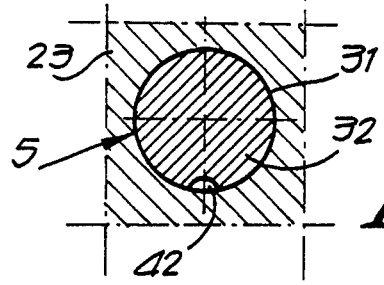

As shown in FIGS. 1 and 2 the invention concerns a transmission unit 1 which mainly consists of a continuously variable transmission 2; a hydraulic cylinder/piston unit 3 to set the transmission ratio of the continuously variable transmission 2; a pressure compensation chamber 4 working in conjunction with the cylinder/piston unit 3; and a passage organ 5 having at least one passageway 6 connecting the pressure compensation chamber 4 with the piston chamber 7 of the above-mentioned cylinder/piston unit 3.

As shown in FIG. 1, the continuously variable transmission 2 has an endless transmission element, such as a V-belt 8, which works in conjunction with at least one V-shaped pulley 9 of which at least one pulley half 10 can be moved. In the example shown, the transmission 2 also has a fixed pulley half 11 forming one whole with a shaft 12. The axially moveable pulley half 10 forms one whole with a bush 13 which can be shifted over the shaft 12.

To this end, the shaft 12 is provided with a ball track 14 at the height of the moveable pulley half 10. The bush 13 has an axial groove 15 on the inside which works in conjunction with the above-mentioned ball track 14 in such a manner that only a movement in the axial direction over the shaft 12 is possible.

The walls of the pulley halves 10 and 11 pointing towards each other are cone-shaped, such that their V-shaped section corresponds with the V-shape of the belt 8.

A spring 16 provides a certain bias with which the zero position of the belt 8 is determined.

The cylinder/piston unit 3 and the pressure compensation chamber 4 are mainly composed of two cylinder-shaped parts 17 and 18.

The first cylinder-shaped part 17 is fixed at one end 19 to the pulley half 10 and stretches parallel to the bush 13 so that, at the height of the end of this bush 13, it first bends slantwise and then perpendicular towards it, whereby a certain distance is kept between the second end 20 and the bush 13.

The second cylinder-shaped part 18 is fixed to the shaft 12 at one end 21 outside the cylinder-shaped part 17. The wall of the part 18 stretches out perpendicular with regard to the shaft 2 and subsequently parallel to it and ends via the space between the cylinder-shaped part 17 and the bush 13 in the cylinder-shaped part 17. Here, the wall of the part 18 first forms a seating 22 for the spring 16 to subsequently run in the shape of a perpendicular wall 23 towards the inside of the first cylinder-shaped part 17. The second end 24 of the cylinder-shaped part 18 makes contact with the inside of the cylinder-shaped part 17 by means of a sealing ring 25.

It is clear that the cylinder-shaped parts 17 and 18 work in conjunction with one another in such a way that a piston chamber 7 on the one hand and a pressure compensation chamber 4 on the other hand as mentioned above are formed.

The hydraulic fluid can reach the piston chamber 7 via successively an axial bore hole 26, a radial bore hole 27 and a recess 28 in the shaft 2 and a passage 29 in the bush 13.

The supply of fluid in the piston chamber 7 results in an increase of pressure therein, as a result of which the moveable pulley half 10 is pushed towards the axially fixed pulley half 11. As soon as the whole starts rotating around the shaft 12, there will be an increase of pressure in the piston chamber 7 due to centrifugal forces acting on the fluid. This increase of pressure can be compensated for by letting fluid flow from the piston chamber 7 to the above-mentioned pressure compensation chamber 4, from where the excess fluid can flow out via an opening 30.

To this end a filler port 31 has been provided in the wall 23 of the second cylinder-shaped part 18, which is better visible in FIG. 2. In this filler port 31, the above-mentioned passage organ 5 has been provided, with a passageway 6 for the correct dosing of the hydraulic fluid.

The present invention is special in that, in order to achieve the aims mentioned in the introduction, the passageway 6 is situated at least partly on the outer surface of the passage organ 5, whereby this part determines the passage and in other words the flow characteristics of the passage organ.

Preferably, the passage organ 5 mainly consists of a plug-shaped body 32 and a collar 33 whose diameter is considerably bigger than that of the body 32. The collar 33 fits in a seating 34.

Preferably, the passage way 6 is built as shown in FIGS. 2 to 5.

Through the collar 33, an axial opening 35 has been provided whose side 36 which is closest to the axis 37 of the passage organ 5, is situated at a distance from the axis 37 which is equal to the radius of the plug-shaped body 32.

On the underside of the collar 33 there is a concentric groove 38 whose smallest diameter is equal to the diameter of the plug-shaped body 32 and whose biggest diameter is at least smaller than the diameter of the collar 33. Together with the inside of the seating 34, the concentric groove 38 forms a duct in which the axial bore hole 35 ends, which in turn ends in a concentric room 39 formed by a bevel at the edge of the seating 34 and the filler port 31.

A groove running around the entire circumference of the plug-shaped body 39 forms, together with the inside of the filler port 31, a second concentric room 40.

The rooms 39 and 40 are connected by means of a first passage opening 41, whereas the room 40 is interconnected to the pressure compensation chamber 4 via a second passage opening 42. The passage openings 41 and 42 each stretch over half the length of the plug-shaped body 32 and are shifted 180 degrees with regard to one another.

The bore hole 36, the groove 38, the room 39, the first passage opening 41, the room 40 and the second passage opening 42 together form the passageway 6. Hereby, it is essential that according to the invention, that the passage openings 41 and 42 which determine the flow are situated at the outer surface or the outside of the passage organ 5, as a result of which they can be made in a relatively simple manner with very precise tolerances.

The passage organ 5 preferably consists of a molding, whereby the passageway 6, or at least the passage openings 41 and 42 are made through molding.

As shown in FIG. 2, a filter gauze 43 can be molding in the collar 33 such that at least the opening 35 is entirely covered by the filter gauze 43.

The present invention is in no way limited to the embodiment described by way of example and shown in the accompanying drawings; on the contrary, such a transmission unit with said passage organ can be made in various forms and dimensions while still remaining within the scope of the invention.

I claim:

1. Transmission unit comprising:
   a continuously variable transmission;
   a hydraulic cylindrical/piston unit including a wall and a piston chamber at least partially defined by the wall, the hydraulic cylinder/piston unit setting a transmission ratio of the continuously variable transmission;
   a pressure compensation chamber which is separated from the piston chamber by the wall and which works in conjunction with the hydraulic cylinder/piston unit; and
   a passage organ having a plug-shaped body and at least one passageway extending at least partially along an outer surface of the passage organ, wherein the plug-shaped body is fixedly mounted in the wall to move therewith and the at least one passageway operatively connects the pressure compensation chamber with the piston chamber.

2. Transmission unit according to claim 1, characterized in that the passage organ is a mold in which the at least one passageway is formed through molding.

3. Transmission unit according to claim 1, further comprising a filter gauze disposed in the passageway.

4. Transmission unit according to claim 3, characterized in that the filter gauze is molded as part of the passage organ.

5. Transmission unit according to claim 1, wherein the plug-shaped body is connected to a collar.

6. Transmission unit according to claim 5, wherein the wall includes a seating and a filler port, the collar is seated in the seating and a portion of the passage organ is disposed in the filler port.

7. Transmission unit according to claim 5, characterized in that the collar has an axial extending opening which is part of the passageway.

8. Transmission unit according to claim 7, further comprising a filter gauze disposed in the opening.

9. Transmission unit according to claim 7, characterized in that a concentric groove is provided in an underside of the collar, the concentric groove working in conjunction with an inside of the seating to form part of the passageway.

10. Transmission unit according to claim 7, characterized in that the passageway has at least one passage opening which is situated on an outside surface of the plug-shaped body.

11. Transmission unit according to claim 5, characterized in that at a height of a transition between the collar and the plug-shaped body, a room is provided in a seating of the passage organ, the room being formed by a bevel such that a passage is formed between a part of the passageway in the collar and a part of the passageway in the plug-shaped body.

12. Transmission unit according to claim 5, characterized in that the passageway at a height of the plug-shaped body comprises a first passage opening in the shape of an axial groove in an outer surface of the plug-shaped body extending from the collar to halfway of the plug-shaped body; a second passage opening rotated 180 degrees with regard to the first passage opening and also being in the shape of an axial groove running from halfway of the plug-shaped body to an end of the plug-shaped body; and a concentric groove extending around the circumference of the plug-shaped body which connects the first and second passage openings.

* * * * *